(12) United States Patent
Carbune et al.

(10) Patent No.: US 11,366,812 B2
(45) Date of Patent: Jun. 21, 2022

(54) USING LIVE DATA STREAMS AND/OR SEARCH QUERIES TO DETERMINE INFORMATION ABOUT DEVELOPING EVENTS

(71) Applicant: Google LLC, Mountain View, CA (US)

(72) Inventors: Victor Carbune, Winterthur (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 184 days.

(21) Appl. No.: 16/621,109

(22) PCT Filed: Jun. 25, 2019

(86) PCT No.: PCT/US2019/038935
§ 371 (c)(1),
(2) Date: Dec. 10, 2019

(87) PCT Pub. No.: WO2020/263226
PCT Pub. Date: Dec. 30, 2020

(65) Prior Publication Data
US 2021/0064624 A1 Mar. 4, 2021

(51) Int. Cl.
*G06F 17/00* (2019.01)
*G06F 16/2455* (2019.01)
(Continued)

(52) U.S. Cl.
CPC .... *G06F 16/24568* (2019.01); *G06F 16/9024* (2019.01); *G06F 16/953* (2019.01); *G06N 20/00* (2019.01)

(58) Field of Classification Search
CPC ............. G06F 16/24568; G06F 16/953; G06F 16/9024; G06F 16/9035; G06F 16/9027; G06N 20/00; G06Q 50/26; G06Q 50/01
See application file for complete search history.

(56) References Cited

U.S. PATENT DOCUMENTS 7,240,049 B2 7/2007 Kapur
8,760,290 B2 6/2014 Piett et al.
(Continued)

OTHER PUBLICATIONS

LePhuoc, D. et al., "The Graph of Things: A step towards the Live Knowledge Graph of connected things;" Web Semantics: Science, Services and Agents on the World Wide Web; vol. 37; pp. 25-35; Mar. 1, 2016.

(Continued)

*Primary Examiner* — Greta L Robinson
(74) *Attorney, Agent, or Firm* — Middleton Reutlinger

(57) ABSTRACT

Techniques and a framework are described herein for gathering information about developing events from multiple live data streams and pushing new pieces of information to interested individuals as those pieces of information are learned. In various implementations, a plurality of live data streams may be monitored. Based on the monitoring, a data structure that models diffusion of information through a population may be generated and applied as input across a machine learning model to generate output. The output may be indicative of a likelihood of occurrence of a developing event and/or a predicted measure of relevancy of the developing event to a particular user. Based on a determination that the likelihood and/or measure of relevancy satisfies a criterion, one or more computing devices may render, as output, information about the developing event.

16 Claims, 7 Drawing Sheets

(51) Int. Cl.
  *G06F 16/953* (2019.01)
  *G06N 20/00* (2019.01)
  *G06F 16/901* (2019.01)

(56) References Cited

U.S. PATENT DOCUMENTS

| | | |
|---|---|---|
| 9,348,815 B1 | 5/2016 | Estes et al. |
| 2013/0238356 A1 | 9/2013 | Torii et al. |
| 2013/0297688 A1 | 11/2013 | Zheng |
| 2014/0129544 A1 | 5/2014 | Haugen et al. |
| 2014/0214832 A1 | 7/2014 | Nandakumar et al. |
| 2015/0302019 A1 | 10/2015 | Takeda |
| 2016/0034712 A1 | 2/2016 | Patton |
| 2017/0083386 A1* | 3/2017 | Wing ............... G06Q 10/10 |
| 2017/0193064 A1 | 7/2017 | Judd et al. |
| 2017/0255536 A1* | 9/2017 | Weissinger ....... G06Q 30/0201 |
| 2017/0316175 A1 | 11/2017 | Hu |
| 2018/0189399 A1 | 7/2018 | Popescul et al. |
| 2018/0349787 A1 | 12/2018 | Horling et al. |
| 2020/0372402 A1* | 11/2020 | Kursun ............... G06N 3/0454 |
| 2020/0372403 A1* | 11/2020 | Kursun ............... G06N 20/20 |

OTHER PUBLICATIONS

Jia, Y. et al., "OpenKN: An Open Knowledge Computational Engine for Network Big Data;" 2014 IEEE/ACM International Conference on Advances in Social Networks Analysis and Mining (ASONAM 2014); pp. 657-664 Aug. 17, 2014.

Steiner, T. et al., "Adding Realtime Coverage to the Google Knowledge Graph;" CEUR Workshop Proceedings; vol. 914; 4 pages; Oct. 3, 2012.

European Patent Office; International Search Report and Written Opinion of Ser. No. PCT/US2019/038935; 15 pages dated Dec. 12, 2019.

* cited by examiner

USING LIVE DATA STREAMS AND/OR SEARCH QUERIES TO DETERMINE INFORMATION ABOUT DEVELOPING EVENTS

BACKGROUND

With the proliferation of internet-enabled devices such as smart phones and smart watches, it is increasingly common for information about newly-developing, or "live," events to be disseminated by witnesses using live data streams such as social media posts, search engine queries, digital image posts, etc. This often occurs even before publication of such information by traditional news outlets. Consequently, established knowledge sources such as search engines may lag behind this organically-evolving information. Moreover, knowledge sources such as search engines are likely to receive numerous queries about developing events before those search engines are able to provide responsive information.

SUMMARY

Accordingly, techniques and a framework are described herein for gathering information about developing events from multiple live data streams and providing new pieces of information to interested individuals. In particular, various implementations are directed to detecting a newly-developing event. An action may, for example, be performed in response to the detection of the newly-developing event, for example controlling a response to the detection of the event or providing an output signal indicating to a third-party that the event is detected. For example, in one example an event such as a fire or crime may be detected and emergency services may be alerted. Additionally or alternatively, some implementations are directed to leveraging recently-submitted search queries about still-developing events—e.g., events for which conventional search engines may lack up-to-date information—to provide information to other inquiring users. These recently-submitted search queries may, at least to some extent, include queries from sources having first-hand or second-hand knowledge, such as witnesses to the event, first responders, witnesses to ancillary events surrounding the event (e.g., person who sees firetrucks racing in a direction towards landmark, but who doesn't see the actual landmark burning), and so forth.

Developing events may be initially identified in various ways. In some implementations, one or more individuals may submit queries to a search engine seeking information about a developing event, such as "Is there a fire at the cathedral?" or "Why is a crowd gathering at Times Square?" If enough queries, e.g., a cluster of semantically-related queries, evidence a newly-developing event, that may trigger analysis of multiple live data streams, such as social media posts, to obtain information to populate an event-specific knowledge graph. As another example, multiple live streams such as social media posts may be analyzed on an ongoing basis. Similar to clusters of semantically-related queries, if a sufficient number or cluster of semantically-related posts are identified, that may evidence a newly-developing event. In yet other implementations, particular live data streams, e.g., from trusted individuals/organizations such as first responders, may be monitored for newly-developing events.

In some implementations, an underlying data structure such as a network model may be generated or maintained that models how various sources of information are connected. For example, the underlying network model may model the structure on which information is disseminated across sources such as social network users (especially sources known to have heightened trustworthiness, such as reporters, law enforcement or government officials, etc.). This underlying network model may include a plurality of nodes representing sources and a plurality of edges representing communication pathways between the plurality of sources.

On top of this underlying network model, the spread of information associated with a developing event may be modeled as a function of time, e.g., using a data structure such as a directed graph. In some implementations, these directed graphs may be applied as input across a machine learning model such as a neural network. The machine learning model may, in some implementations, be trained to operate with graphs as input, and may be, for instance, a graph convolutional network ("GCN") or a graph attention network ("GAN"). In some implementations, the directed graph itself may be applied as input across the machine learning model. Additionally or alternatively, in some implementations, the directed graph may first be embedded into a latent space, e.g., using techniques such as graph neural networks ("GNN"), and then the latent space embedding may be applied as input across the machine learning model.

Output generated based on application of the directed graph across the model may be indicative of, for instance, a likelihood of occurrence of a developing event, and/or a prediction of whether the event will be relevant to a particular user. For example, in some implementations, the machine learning model may model the following probability:

P(an event occurring at node x|particular user's features, graph)=probability of an event occurring, conditioned on the particular user and the graph structure/embedding (e.g., of a local neighborhood)

In other implementations, the probability P of a developing event occurring may be a joint probability, e.g., determined using the following equation:

P(an event occurring at node x, user observing event at node x|user features, graph features)

In various implementations, these machine learning models may be trained using a plurality of training examples. Each training example may include a prior data structure, such as a directed graph, that modeled diffusion of information about a respective verified past event through a plurality of sources. For example, a directed graph may be generated for a verified event that occurred in the past. The directed graph then may be labeled, e.g., as having a relative high likelihood of being a developing event. In some implementations, a training example may also include, as label(s) and/or as additional input(s), user attributes that signal likely interest in the event. For example, a training example for a past political protest may be assigned a label, or include as input, a user attribute of "political." This training example may then be applied as input across the machine learning model to generate output. The extent the output varies from indicating that the event would likely be of interest to politically-oriented users—i.e. the loss function—may be considered the error. The machine learning model may be trained, e.g., using techniques such as gradient descent and back propagation, to correct for the error, or put another way, minimize the loss function.

In some implementations, the machine learning model training may effectively capture the reliability of individual sources. For example, a particular live data stream, such as a police department's social media feed, may consistently publish reliable information that aligns closely with an event's ultimate factual attributes. Accordingly, a node in a directed graph that represents that particular source may be weighted more heavily by a GCN/GAN than, say, another node associated with an unknown source (or a known unreliable source). Put another way, during training the GCN/GAN may learn which nodes (or types of nodes) are more reliable than others. It might often be the case that the first sources of information, e.g., the first people to submit queries seeking information about an event or social media posts about the event, are first-hand witnesses of a developing event. These people are likely more trustworthy or reliable than, say, a third wave of sources that receive information from upstream witnesses and pass on new, unverified information (e.g., rumors).

Once a developing event is deemed likely and relevant to a particular individual, then other queries associated with the event may be leveraged to provide the particular individual with additional information about the developing event. For example, suppose the particular individual issues a query about the event ("How big is the fire at the Cathedral?") for which responsive information is not yet available from a conventional search engine. Rather than being notified that no responsive information is available, the particular individual may be provided with alternative query suggestions for which there may be more responsive information available. Additionally or alternatively, the particular individual may be provided information that is responsive to those alternative query suggestions.

Sometimes queries from other individuals themselves may provide additional information, especially when those other individuals are first-hand witnesses to the event. For example, a first individual may submit a queries such as "what artifacts are at risk from the cathedral fire?" Other individuals with more knowledge about the cathedral's collection of artifacts may have previously submitted queries such as, "did they save <relic A> from the cathedral fire?" These previously-submitted queries may be mined to provide the first individual with, for instance, alternative query suggestions that both guide the individual as to a better query and/or provide the individual with information responsive to his or her own query, such as the fact that <relic A> is likely at risk.

In some implementations, queries that are, on their faces (i.e., semantically and/or syntactically), seemingly unrelated may in fact be related to the same event. By clustering queries and/or other data from live data streams together by their relations to developing events, it is possible for a pair of queries that are not facially or explicitly related to each other to be associated in a cluster. Consequently, an individual submitting a query similar to the first query of the pair of queries may be suggested an alternative query similar to the second query of the pair.

As an example, a first individual in Zurich may see police cars converge on a bank and submit a query such as "details about crime in city center." Another individual may hear secondhand that police have captured a suspect and may submit the query, "recent police statement about burglars in Zurich." On their faces, these queries are semantically dissimilar, other than perhaps a slight semantic relationship between "crime" and "burglars." Without more there may be nothing to tie these two queries together. However, with techniques described herein these queries may be clustered around a developing event in Zurich city center. For example, the first individual's smart phone may include a position coordinate sensor that indicates the first individual is in Zurich. The second individual's query explicitly mentions Zurich, and so these queries may be clustered with the same developing event. Consequently, when the first individual submits his or her query, "details about crime in city center," he or she may receive the alternative query suggestion, "recent police statement about burglars in Zurich."

In some implementations, a method is provided that includes: monitoring a plurality of live data streams; based on the monitoring, generating a data structure that models diffusion of information through a population; applying the data structure as input across a machine learning model to generate output, wherein the output is indicative of a likelihood of occurrence of a developing event; and based on a determination that the likelihood of occurrence of a developing event satisfies a criterion, causing one or more computing devices to render, as output, information about the developing event.

These and other implementations of technology disclosed herein may optionally include one or more of the following features.

In some implementations, the data structure comprises a directed graph, and the directed graph is generated based on an underlying network model that includes a plurality of nodes representing sources and a plurality of edges representing communication pathways between the plurality of sources. In some implementations, the data structure comprises a graph and the machine learning model is trained using a plurality of training examples, each training example including a prior graph that modeled diffusion of information about a respective verified past event through a plurality of sources.

In some implementations, the output is further indicative of a predicted measure of relevancy of the developing event to a particular user. In some implementations, the applying further includes applying one or more attributes of the particular user as input across the machine learning model.

In some implementations, the machine learning model comprises a machine learning model trained to operate on graph input. In some implementations, the information about the developing event is determined based at least in part on a corpus of queries submitted to one or more search engines, wherein the corpus of queries relate to the developing event. In some implementations, the information about the developing event comprises an alternative query suggestion to obtain additional information about the developing event.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
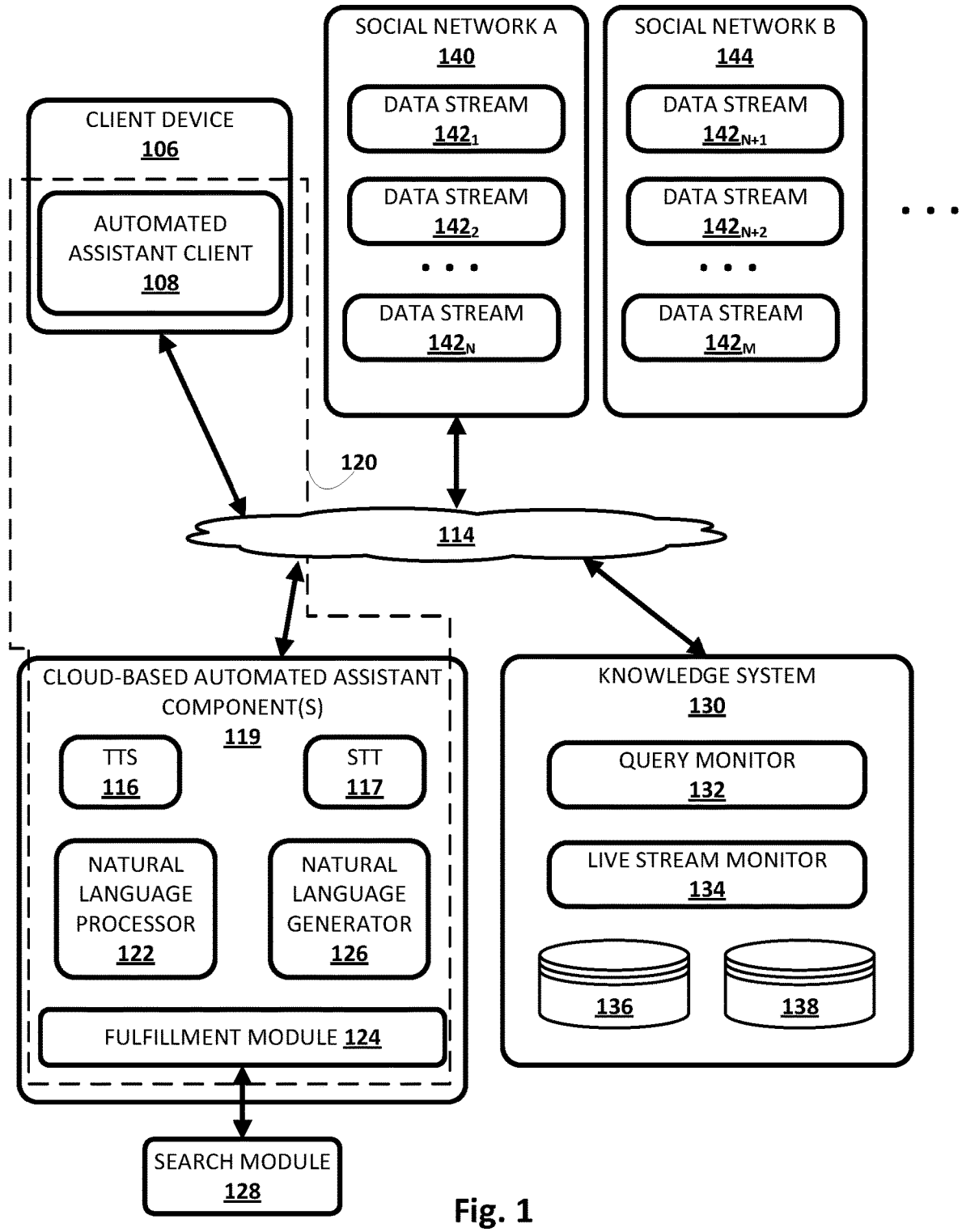
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108).

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with oral invocation phrases.

In many implementations, automated assistant 120 may employ speech recognition processing to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

Text-to-speech ("TTS") module 116 may be configured to convert textual data (e.g., natural language responses formulated by automated assistant 120) into computer-generated speech output. Speech-to-text ("STT") module 117 may be configured to convert audio data captured by speech capture module 110 into text. In some implementations, this text (or alternatively, an embedding thereof) may then be provided to a natural language processor 122. In some implementations, STT module 117 may convert an audio recording of speech to one or more phonemes, and then convert the one or more phonemes to text. Additionally or alternatively, in some implementations, STT module 117 may employ a state decoding graph.

Automated assistant 120 (and in particular, cloud-based automated assistant components 119) may include the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 122 may additionally and/or alternatively include a coreference resolver (not depicted) configured to group, or "cluster," references to the same entity based on one or more contextual cues.

In some implementations, data about entities may be stored in one or more databases, such as in a knowledge graph 136 (which is part of a separate knowledge system 130 in FIG. 1). In some implementations, the knowledge graph 136 may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

Fulfillment module 124 may be configured to receive the predicted/estimated intent that is output by natural language processor 122 and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. In some implementations, the fulfillment information may be provided to a natural language generator ("NLG" in some Figs.) 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 128 configured to search corpuses of documents and/or other data sources (e.g., knowledge graph 136, etc.), e.g., of a knowledge system 130, for responsive information. Fulfillment module 124 may provide data indicative of the search query (e.g., the text of the query, a reduced dimensionality embedding, etc.) to search module 128. Search module 128 may provide responsive information, such as global positioning system ("GPS") coordinates, or other more explicit information, such as "Timberline Lodge, Mt. Hood, Oreg." This responsive information may form part of the fulfillment information generated by fulfillment module 124.

Knowledge system 130 may include one or more computing devices, such as one or more server computers (e.g., blade servers) acting in cooperation to assemble knowledge from various sources (e.g., web crawling through databases of documents), and to provide various services and information to requesting entities. Knowledge system 130 may act as, among other things, a search engine that provides responsive information (e.g., search results, directly responsive information, deep links, etc.) to search queries. Knowledge system 130 may perform a variety of other services as well, and therefore is not limited to those components depicted in FIG. 1.

Knowledge system 130 may include the knowledge graph 136 mentioned previously, as well as a query monitor 132 and/or a live stream monitor 134. In some implementations, knowledge system 130 may, among other things, receive search queries and provide responsive information. In various implementations, query monitor 132 may be configured to monitor queries submitted to, e.g., a search engine such as knowledge system 130, and to cluster queries that are semantically related to each other and/or to developing events together. Clusters of semantically-related queries may then be leveraged to provide interested users with evolving information about developing events, e.g., from other queries and/or from live data streams.

In various implementations, live stream monitor 134 may be configured to monitor a plurality of live data streams to detect developing events. As mentioned previously, information about newly developing events such as disasters, crimes, impromptu gatherings (e.g., protests), accidents, etc., may not be immediately available from traditional information sources such as knowledge graph 136 or from other data sources often utilized by search engines. Rather, these traditional data sources tend to lag behind other more nimble sources such as live data streams.

As used herein, a "live data stream" may include an information stream generated by one or more individuals (e.g., by an entity such as a business or government organization) that includes a plurality of updates generated over time. These updates may include text, images, videos, audio recordings, or any other form of user-created, user-curated, and/or user-compiled information that is capable of being disseminated to other individuals who have access to these live data streams. A ubiquitous form of live data stream update is a social media post, in which the posting user can include text, audio data, video data, image data, hyperlinks, applets, etc.

In FIG. 1, for instance, a first social network 140 may provide, e.g., from a plurality of users of the first social network 140, a first plurality of live data streams $142_{1-N}$. Each live data stream 142 may be generated by a person or persons associated with a social media profile of the first social network 140. Similarly, a second social media network 144 may provide, e.g., from a plurality of users of the second social network 144, a second plurality of live data streams $142_{N+1}$-$142_M$. N and M are positive integers. While two social networks are depicted in FIG. 1, this is not meant to be limiting. Any number of social networks of various types may provide live data streams.

Some social networks may be designed to primarily allow users to create posts that are constrained to some number of characters, words, images, etc., and to allow other users to "follow" the posting users, even if the other users do not personally know the posting users. For example, with some social networks, many users may follow (or subscribe to) a smaller number of "influencers" who are often celebrities or are otherwise well-known (e.g., politicians, news reporters). These influencers are less likely to follow (or subscribe to) their followers' live data streams, unless those followers are personal acquaintances of the influencer or are other influencers. By consistently disseminating information that followers find compelling or otherwise valuable, influencers can, in some cases, gain credibility and/or generate income based on their social media posts.

Other social networks may be designed to primarily allow users to connect to (or "befriend") other users that they know or meet in real life. Once connected, users are able to share content such as text, images, videos, audio, hyperlinks, etc. with their "friends" or "contacts" on social media. These other social networks may be used by users to connect with friends on an informal basis, and/or to connect with business acquaintances on a more formal basis (e.g., akin to a virtual rolodex). These websites often allow users to post messages on other users' walls, such as "Happy birthday," "Congratulations on the new family member!" and other types of salutations, greetings, reach outs, etc.

Although not depicted in FIG. 1, other systems that are similar to social networks may also be sources of live data streams. For example, users may have accounts on, and post videos to, video-sharing websites. In some instances, these video sharing websites may allow users subscribe to other users' video updates, similar to some of the social networks described previously. Thus, for instance, a particular user who regularly or periodically posts videos may, in effect, create a live stream. Other similar websites are designed specifically to enable users to post images, particularly media that spreads ideas, activities, concepts, jokes, catchphrases, or other information, commonly referred to as Internet "memes."

Figure 2:
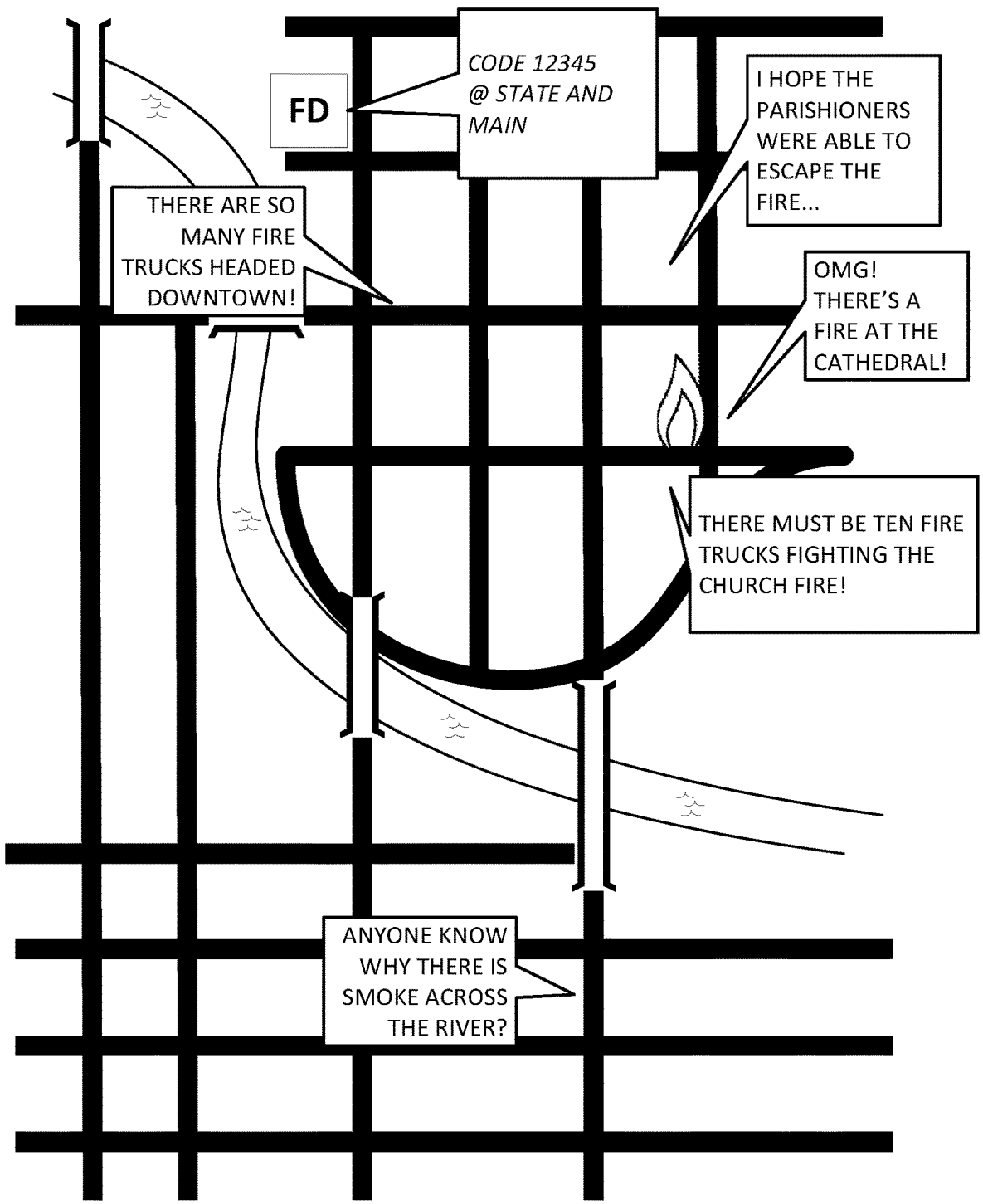
FIG. 2 depicts an example scenario in which techniques described herein may be employed to detect a developing event based on semantically-related data detected at multiple live data streams.

FIG. 2 depicts an example scenario in which techniques described herein may be employed, e.g., by live stream monitor 134, to detect a developing event based on semantically-related data detected at multiple live data streams (e.g., $142_{1-M}$). FIG. 2 schematically depicts an overhead view of a portion of a city, with the black lines representing roads and a river winding from top left to bottom middle right. As indicated by the flame, a fire has broken out at a cathedral located in an eastern portion of the city.

In the earliest stages of this fire, e.g., when it is first detected by one or more witnesses, it is unlikely that traditional data sources such as knowledge graph 136 or search engines will have information available about the fire. During this period the fire can be thought of as a "developing event" for which information is being gathered by multiple sources. These sources may disseminate this information by way of live data streams. Live stream monitor 134 may employ techniques described herein to determine a likelihood that a new event is developing. Additionally or alternatively, in some implementations, live stream monitor 134 may determine a likelihood that the developing event will be relevant to particular users.

In FIG. 2, a first user very close to the fire has posted to social media, "OMG! There's a fire at the cathedral!" Another nearby user posts, "There must be ten fire trucks fighting the church fire!" Yet another nearby users posts, "I hope the parishioners were able to escape the fire . . . " In various implementations, live stream monitor 134 may analyze a plurality of live streams, include these three live streams, to determine that a developing event is likely occurring. Live stream monitor 134 may syntactically and/or semantically process, or have another system syntactically and/or semantically process, these live data stream updates to determine that they are related. For example, live stream monitor 134 may generate embeddings of these live stream updates and determine that they are related based on the fact that the embeddings cluster together in a latent space.

In some implementations, live stream monitor 134 may consider other informational signals besides the live stream updates in determining whether a developing event is occurring. For example, in FIG. 2, live stream monitor 134 may determine, e.g., from position coordinates (e.g., GPS) generated by mobile devices operated by the three different users, that the three users are near each other. Live stream monitor 134 may additionally or alternatively determine that the three live stream updates are temporally proximate, e.g., within minutes or even seconds of each other. Combined with the syntactic and/or semantic similarity of their live stream updates, live stream monitor 134 may determine not only that a developing event unfolding, but that the developing event is unfolding somewhere proximate to these three users. Yet other informational signals may also be considered in addition to or instead of those just mentioned, including but not limiting to demographic information about posting users (e.g., ages, genders), known preferences or interests of posting users (e.g., determined from their online profiles), known affiliations of posting users (e.g., alma maters, organizations, employers), and so forth.

The first three posting users described above are relatively close to the fire in FIG. 2. In some implementations, their posts may be sufficient to determine with a reasonable amount of confidence that a developing event (the cathedral fire) is occurring. However, other users that are farther away spatially and/or temporally from the fire may also update their live streams with potentially-relevant information. These farther-removed users may have less direct knowledge of the fire, and instead may possess circumstantial knowledge of the fire. For example, another user a few blocks west of the fire posts, "There are so many fire trucks headed downtown!" This user may not know that a cathedral in particular is on fire, but can surmise that there is a fire somewhere downtown based on the trajectories of the firetrucks he or she observed. As another example, a user south of the river posts, "Anyone know why there is smoke across the river?" Again, the southern user may not know which building(s) are ablaze but can probably surmise that a fire is occurring.

Whether or how useful the farther-removed users' live stream updates are may depend on whether they include additional information that is not available in live stream updates from users more proximate (spatially or temporally) to the developing event. Suppose the western user's post, "There are so many fire trucks headed downtown!" occurs and/or is detected by live stream monitor 134 before the post from the more spatially proximate user, "There must be ten fire trucks fighting the church fire!" The western user's post may signal that the fire is likely relatively large, whereas the other two posts from the other two spatially-proximate users ("I hope the parishioners . . . " and "OMG! There's a fire . . . ") only establish that there is a fire, not its potential size.

In some implementations, particular live data streams may be considered more reliable than others. In some cases, updates posted to particularly reliable live data streams may trigger live stream monitor 134 to search other lesser-known live data streams for additional information. For example, in FIG. 2, a fire department ("FD") publishes its own live stream update, "CODE 12345 @ STATE AND MAIN." Assuming "CODE 12345" corresponds to a fire, such a post may be considered highly reliable due to its source being an official government agency, rather than a lesser-known individual. Notably, the post does not indicate that it is the cathedral that is on fire, but instead simply states the location as "STATE AND MAIN." Assuming there are other buildings in that area, it may not be possible to conclude from the fire department's post alone that the cathedral is on fire. However, when combined with other corroborating posts that indicate the cathedral is on fire, live stream monitor 134 may become very confident that a developing event of a fire at the cathedral is occurring. Although it is possible that the fire department received a false alarm, and so even its post may not necessarily be considered dispositive or conclusive by live stream monitor 134.

In some implementations, techniques described herein to identify developing events may be used to automatically trigger responsive actions by various entities. For example, the first three users' posts described previously may be sufficient for live stream monitor 134 to determine, e.g., with some threshold amount of confidence, that there is indeed a fire occurring at the cathedral. Upon satisfaction of this threshold, live stream monitor 134 or another component of knowledge system 130 may automatically notify the fire department of the fire at the cathedral, e.g., via an automated phone call, automated alarm on an emergency response system, etc. In such a scenario, the fire department's post in FIG. 2 may in fact be part of the fire department's reaction to the three initial live stream updates indicating the occurrence of the developing cathedral fire event.

Figure 3:
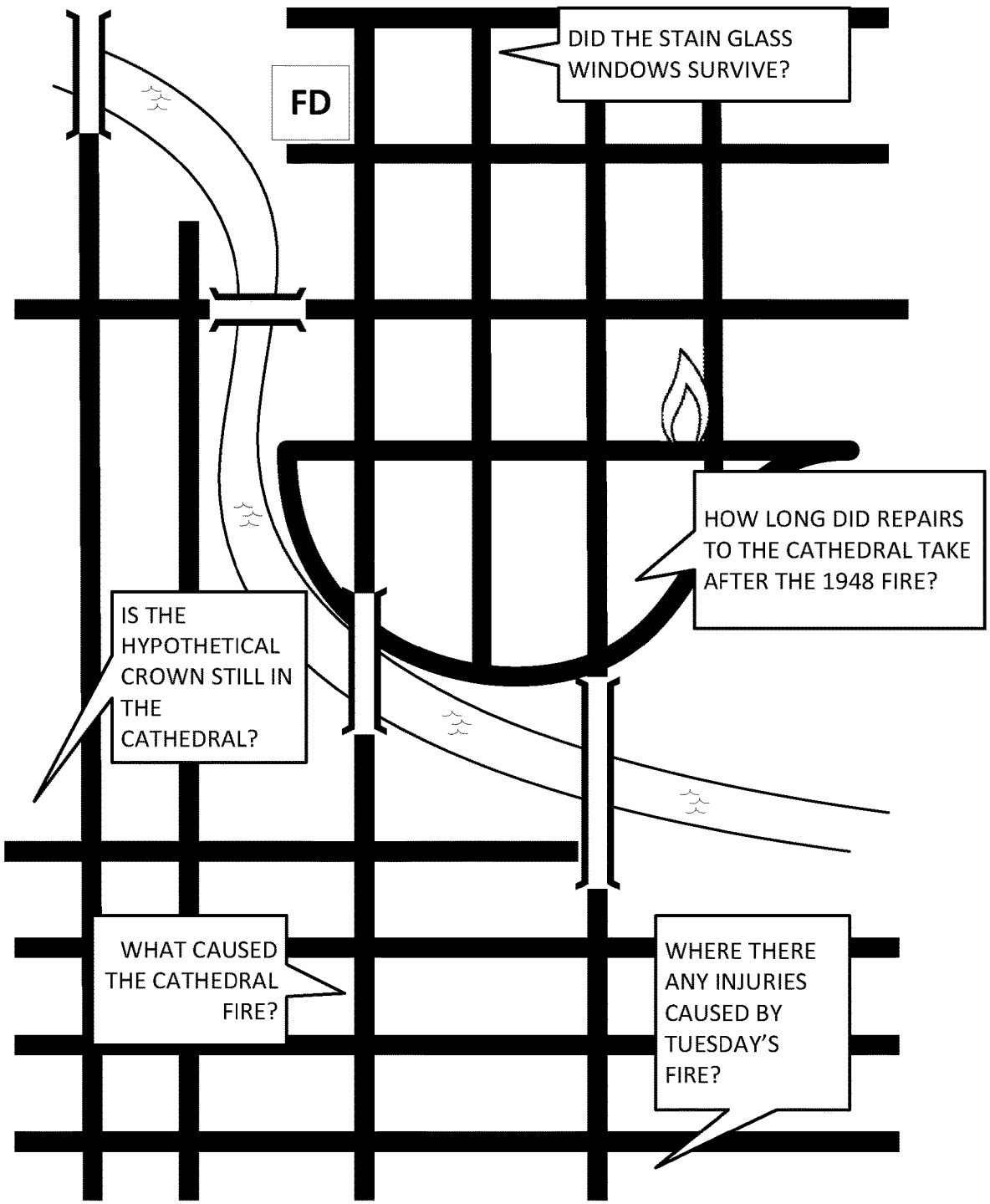
FIG. 3 depicts the example scenario of FIG. 2 after the event has been detected, when live data streams and/or search engine queries are analyzed to determine additional information about the developing event.

FIG. 3 depicts the example scenario of FIG. 2 after the developing event has been established (e.g., a confidence measure that the developing event is real satisfies some threshold). At this point, live data streams and/or search engine queries may be analyzed to determine additional information about the developing event. These data may then be leveraged to provide information to other inquiring users. Although the events of FIG. 3 temporally follow those of FIG. 2, they may still be relatively "fresh" such that conventional information sources such as knowledge graph 136 and/or search engines are not yet fully informed.

In FIG. 3 a northern user submits a search engine query, "Did the stain glass windows survive?" This query may be determined, e.g., by query monitor 132, to be semantically-related to the developing cathedral fire event, e.g., because "stain glass windows" may have a relatively strong semantic relationship with cathedrals in general, and the word "survive" suggests occurrence of some destructive event, e.g., a fire. Another user relatively close to the fire asks, "How long did repairs to the cathedral take after the 1948 fire?" Yet another user in the far south of the city asks, "Where there any injuries caused by Tuesday's fire?" A southwestern user asks, "What caused the cathedral fire?" A western user asks, "is the hypothetical crown still in the cathedral?" Any of these queries, whether they are yet answerable by a convention data source such as a search engine or knowledge graph 136, may be leveraged to quickly disseminate new information about the developing event to interested users.

Figure 4:
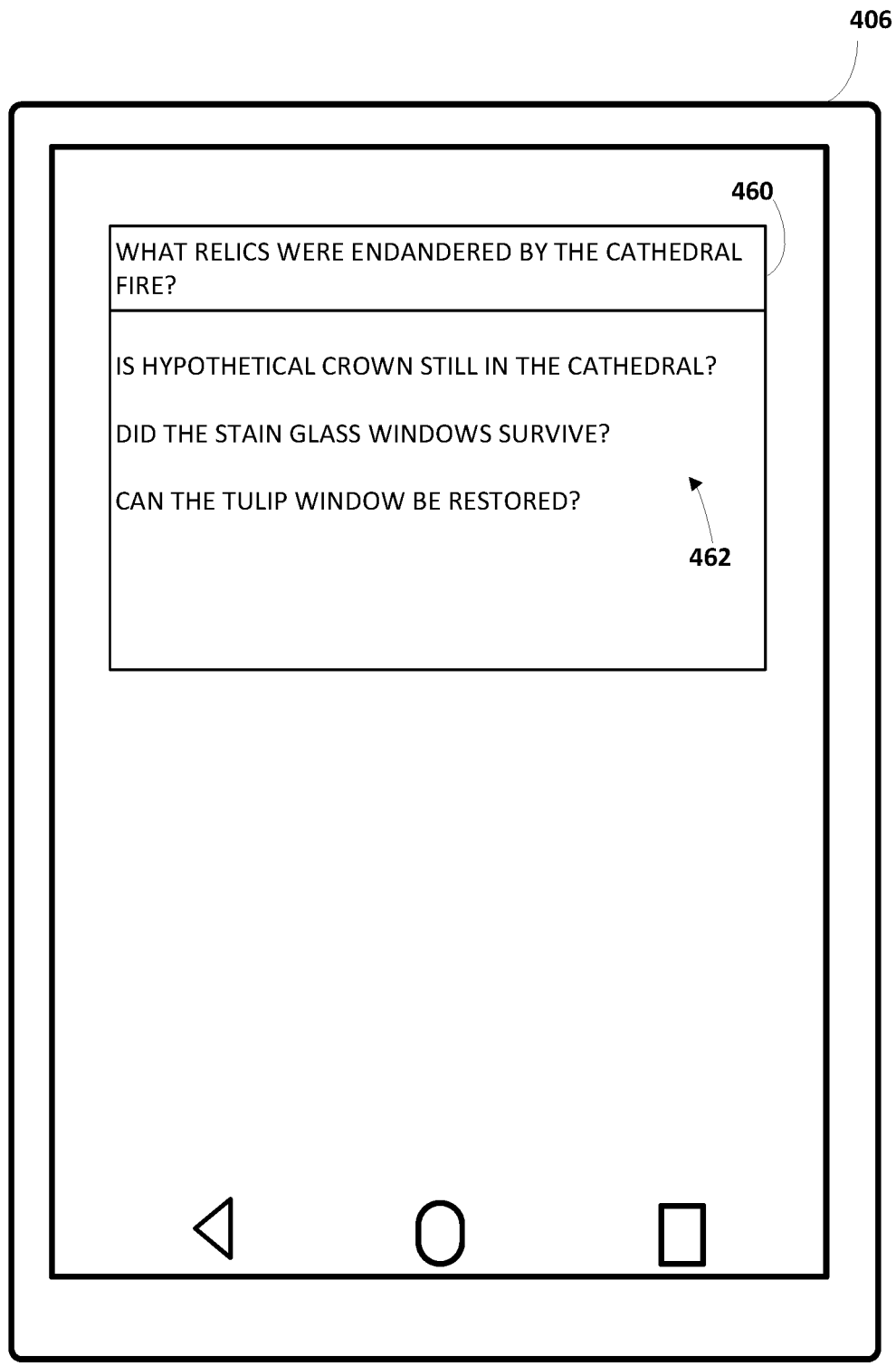
FIG. 4 depicts an example of how search queries may be leveraged to provide information about a developing event.

FIG. 4 depicts an example client device 406 in the form of a smart phone or tablet computer. Client device 406 includes various components commonly found in such client devices, which are not described herein in detail. In FIG. 4, a user has interacted with a search query interface 460 to pose the question, "What relics were endangered by the cathedral fire?" The user may pose this question by typing it on a virtual or physical keyboard (not depicted) or by speaking the request to automated assistant 120. In either case, query monitor 132 may receive the query and may offer alternative query suggestions 462 that are generated from other users' queries associated with the developing event, such as the queries depicted in FIG. 3.

In this example, assume that the query posed by the user is not yet answerable from conventional data sources such as a search engine or knowledge graph 136 because the developing event is too fresh. The alternative query suggestions 462 presented to the user may nonetheless provide information that is responsive to the user's request. For example, the alternative query suggestions 462 include, "Is Hypothetical Crown still in the cathedral?", "Did the stain glass windows survive?", and "Can the Tulip Window be restored?" Even though they are posed as questions, these alternative query questions 462 provide information that is responsive to the user's request—the potentially-endangered relics include the "Hypothetical Crown," "stain glass windows," and the "Tulip Window."

Figure 5A:
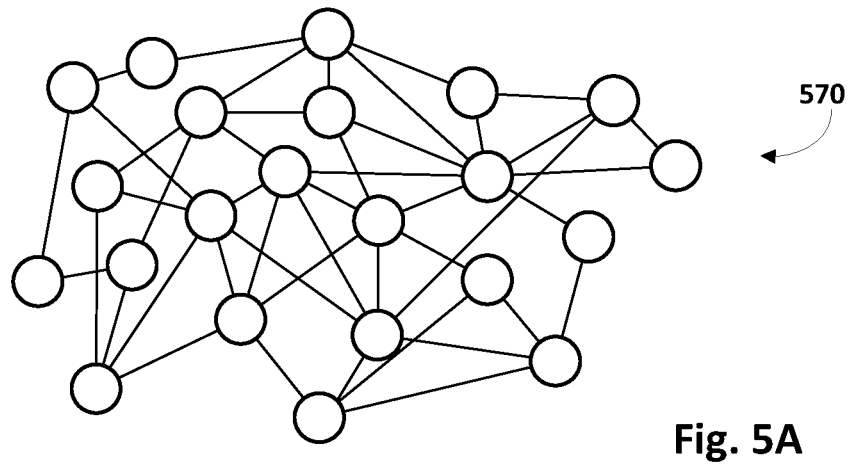
FIG. 5A, FIG. 5B, and FIG. 5C depict examples of how diffusion of information may be simulated on a network of sources.
Figure 5B:
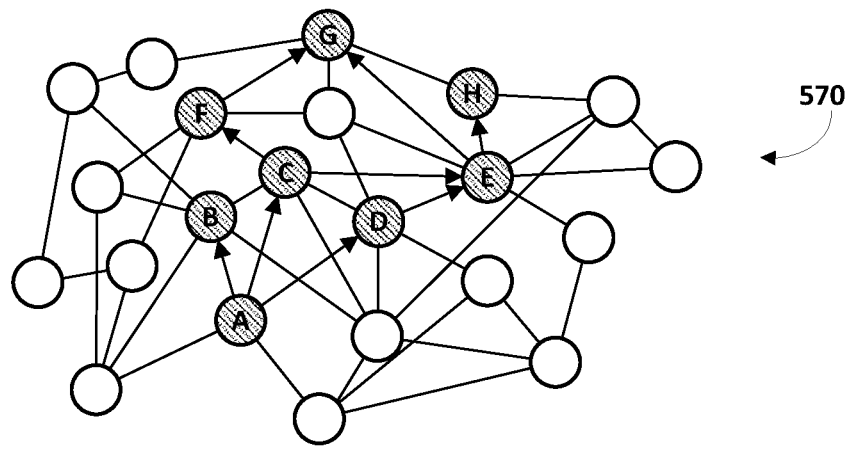
Figure 5C:
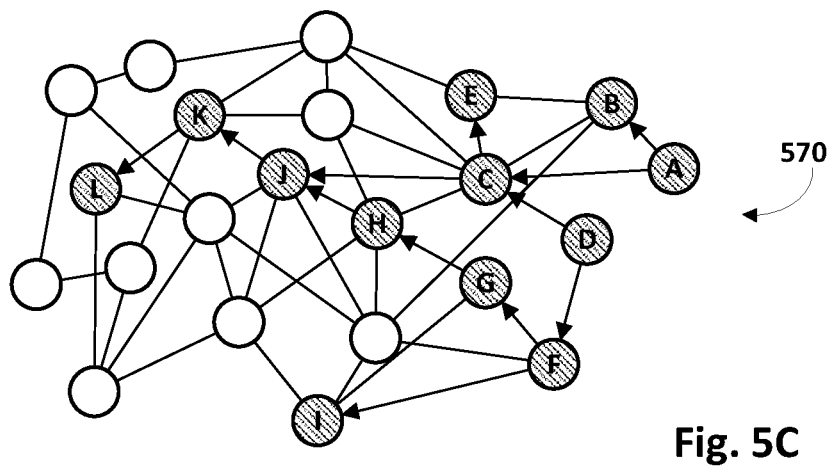

In some implementations, live stream monitor 134 may analyze how information is diffused across a population to determine a likelihood of a developing event and/or whether that developing event will be relevant to particular entities. FIGS. 5A-C schematically demonstrate one example of how this analysis may be performed. In FIG. 5A, a network model 570 is depicted that represents communication pathways between individuals of a population. In particular, nodes of network model 570 represent individual entities or "sources" of live stream updates, such as people, organizations, etc. Edges between nodes represent established communication pathways between the sources.

For example, suppose one entity follows another entity on a particular social network. An edge between nodes corresponding to those entities may represent this relationship between them. If a first entity of the two follows the second entity but the reverse is not true, then in some implementations, the edge may be directed from the second entity to the first to represent the fact that information flows from the second entity to the first, but not in reverse. However, this is not required in all implementations. As another example, if two individuals are "friends" on a social network, they are able to communicate with each other, and therefore, an undirected edge may be established between their respective nodes.

In various implementations, live data streams associated with at least some of the entities corresponding to the nodes of network model 570 may be monitored, e.g., by live stream monitor 134, for developing events. Based on the monitoring, in some implementations, live stream monitor 134 may generate a separate data structure that models diffusion of information about a potential developing event through a population. This separate data structure may sit on top of the underlying network model 570. In some implementations the separate data structure may take the form of a directed graph that indicates how information about a developing event flowed between nodes of an underlying network model 570 over time.

In some implementations, live stream monitor 134 may apply the data structure as input across a machine learning model, such as a graph neural network ("GNN"), a graph convolutional network ("GCN"), a graph attention network ("GAN"), etc., to generate output. In some implementations, the output may be indicative of a likelihood of occurrence of a developing event, and/or a predicted measure of relevancy of the developing event to a particular user. In some implementations, the output may include an embedding generated from the data structure, which can then be compared to other embeddings generated from other data structures corresponding to other events.

In various implementations, the machine learning model may be trained using a plurality of training examples. Each training example may include, for instance, a prior graph that modeled diffusion of information about a respective verified past event through a plurality of sources. Examples of this are shown in FIGS. 5B and 5C.

In FIG. 5B, a directed graph is indicated at the nodes labeled A-H. This directed graph represents the fact that an entity or source corresponding to node A of the underlying network model 570 was the first to post a live stream update about a potential developing event. For example, that source (A) may have been an eye witness to the developing event. That source (A) posts its update, which is received by followers such as the entities represented by nodes B-D. Those entities in turn pass on the information, directly or indirectly, to other entities corresponding to nodes E-H. For purposes of the present disclosure, the letters A, B, C, . . . will not be assigned exclusively to particular sources, but instead will be used to indicate an order of a directed graph.

The directed graph A-H of FIG. 5B may be used as a training example for training one or more of the aforementioned machine learning models (e.g., GNN, GCN, GAN). In some implementations in which the developing event is later confirmed or corroborated, details of the event may be used to label the directed graph. For example, in some implementations, the training example may be labeled with a probability that the event is truly happening and/or another probability that the event would be relevant to a particular entity. In some examples, the training example may include, as additional inputs, features of entities to which the developing event associated with the training example would be relevant. The training example may then be applied as input across a machine learning model. To the extent output of the machine learning model generated from the directed graph differs from any label(s) assigned to the graph, that difference, or "error," may be used to train the machine learning model, e.g., using techniques such as back propagation and gradient descent.

A different directed graph A-L is depicted on top of underlying network model 570 in FIG. 5C. This directed graph A-L may correspond to a different verified past event than that represented by the directed graph A-H of FIG. 5B. In this example, nodes A and D apparently learn of the past developing event first, and then diffuse that information to other nodes B-C and E-L of underlying network model 570. As with the directed graph A-H of FIG. 5B, the directed graph A-L of FIG. 5C may be used as a training example for training one or more of the aforementioned machine learning models (e.g., GNN, GCN, GAN).

In some implementations, the machine learning model(s) may be trained to generally predict the likelihood that a developing event is occurring. However, in other implementations, the machine learning model(s) may be trained to additionally or alternatively predict the probability P of the developing event being relevant to a particular user:

P(an event occurring at node x|particular user's features, graph)

Intuitively, this probability P may represent a probability of an event occurring at a particular node x (e.g., of underlying network model 570), conditioned on one or more features of the particular user and the data structure/embedding (e.g., of a local neighborhood). Thus, the input for the machine learning model(s) may include a data structure, such as a directed graph or an embedding generated therefrom, that models diffusion of information about the developing event across a population, as well as one or more features or attributes of the user, such as preferences, interests, age, gender, various other demographics, location, etc.

In some implementations, multiple machine learning models may be employed to predict the probability P described above. As a non-limiting example, in some implementations, a directed graph that models diffusion of information across a population about a developing event may be generated. The directed graph may then be applied as input across a first machine learning model to generate an embedding (i.e., a feature vector). This first machine learning model may be, for instance, one of the graph-centric models described previously, such as a GNN, a GCN, a GAN, etc. Consequently, the embedding may be a semantically-rich representation of how the information was diffused across the various sources forming the population.

The embedding generated by the first machine learning model may then be applied as input across a second machine learning model, such as a support vector machine, neural network (including various types of neural networks such as convolutional, recurrent, etc.), e.g., along with other input indicative of features of a user under consideration. The second machine learning model may be trained to generate, for instance, output indicative of a probability that the developing event would be relevant to a user having the user features that are applied as input across the second machine learning model.

As noted previously, in some implementations, the probability P may be compared to some threshold to determine whether to automatically trigger some responsive action. For example, in some implementations, if the probability P satisfies some threshold associated with developing events that warrant a response from first responders, then one or more messages may be transmitted, e.g., by live stream monitor 134 to a system associated with first responder(s). For example, a 911 call may be initiated, and natural language output that conveys details about the developing event may be generated, e.g., by natural language generator 126 in FIG. 1 or another similar component, and then may be provided to the 911 operator.

Figure 6:
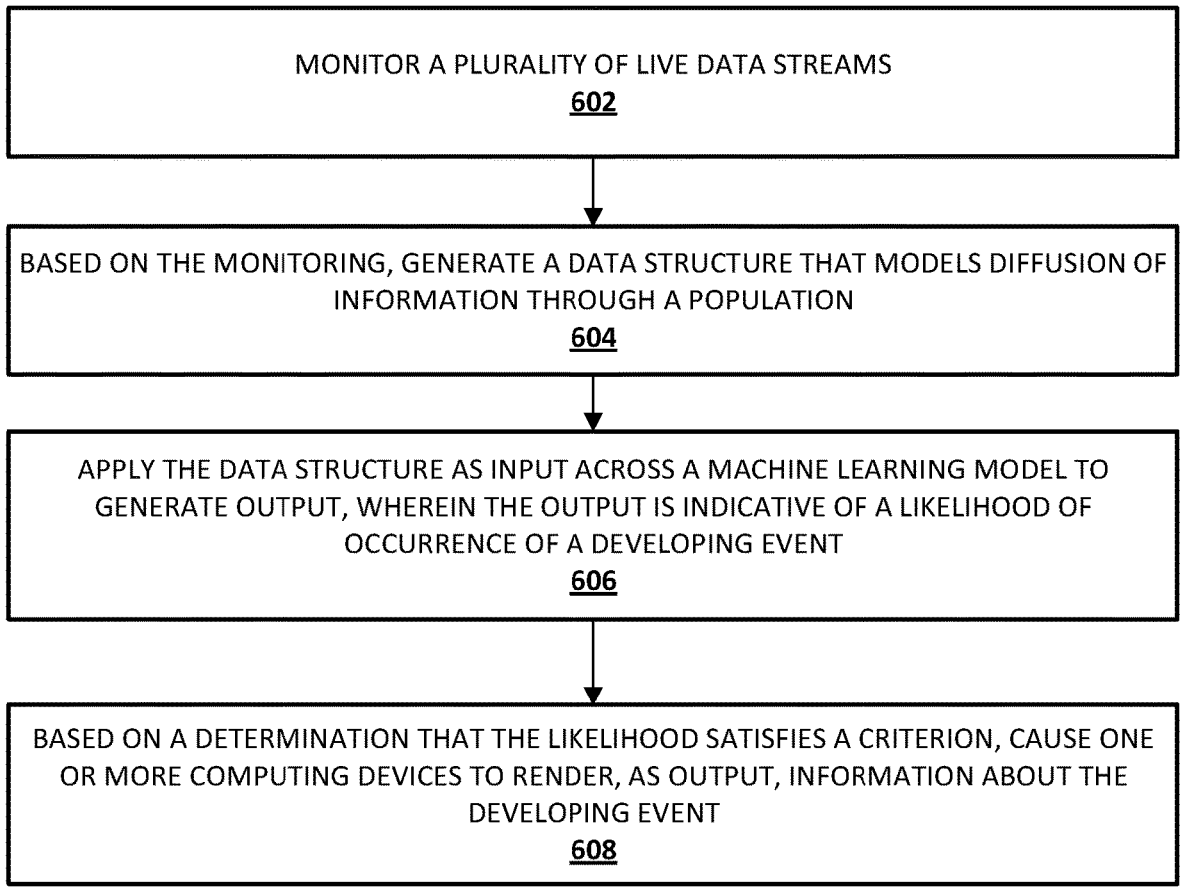
FIG. 6 depicts a flowchart illustrating an example methods for practicing selected aspects of the present disclosure.

FIG. 6 is a flowchart illustrating an example method 600 according to implementations disclosed herein. For convenience, the operations of the flow chart are described with reference to a system that performs the operations. This system may include various components of various computer systems, such as one or more components of computing systems that implement automated assistant 120. Moreover, while operations of method 600 are shown in a particular order, this is not meant to be limiting. One or more operations may be reordered, omitted or added.

At block 602, the system may monitor a plurality of live data streams. For example, live stream monitor 134 may monitor particular live data streams that are known to be reliable and/or otherwise associated with sources that often have early information about developing events. As noted above, some first responder entities such as police and/or fire departments may, e.g., as a public service, maintain social networking profiles. These entities may often be among the first to know about some events, e.g., because other sources who witness the events may first notify the first responders before taking any other actions, such as updating their own live data streams. First responders may post information about developing events as a public service, so that citizens can be informed with reliable information as soon as possible.

Other live data streams that may be deemed particularly reliable—and therefore may be proactively monitored by live stream monitor 134—may include, for instance, live streams associated with news reporters, including social networking profiles of news organizations such as newspapers, television stations, Internet news sources, and so forth. Yet other live data streams that may be deemed particularly reliable—and therefore may be proactively monitored by live stream monitor 134—may include, for instance, live streams associated with politicians, government officials, scientists, or any other source that may be either in a position to learn about developing events more rapidly than the general population and/or that are, for whatever reason, deemed more trustworthy.

In some implementations, live stream monitor 134 may simply monitor a random selection of live data streams. Additionally or alternatively, in some implementations, live stream monitor 134 may monitor particularly active live data streams, e.g., under the assumption that these active sources are more likely to post live updates about developing events they witness. Additionally or alternatively, in some implementations, live stream monitor 134 may select sources from geographic areas in which developing events are more likely to occur. For example, live stream monitor 134 may favor a first source that lives in a densely-populated area over a second source that lives in a rural area. Intuitively, the first source is more likely than the second source to be witness to developing events, particularly developing events caused by or otherwise related to people. Additionally or alternatively, in some implementations, live stream monitor 134 may monitor a plurality of live data streams associated with sources distributed across a large geographic area. This may increase the likelihood that a developing event at a particular location is witnessed by at least one of the sources.

Based on the monitoring, at block 604, the system may generate a data structure that models diffusion of information through a population. As noted above, in some implementations, this data structure may take the form of a directed graph that is generated on top of an underlying network model (e.g., 570 in FIGS. 5A-C) that includes a plurality of nodes representing sources and a plurality of edges representing communication pathways between the plurality of sources.

At block 606, the system may apply the data structure as input across a machine learning model to generate output. As noted previously, the machine learning model may take various forms and/or may include one or more machine learning models. The output may be indicative of a likelihood of occurrence of a developing event. For example, a machine learning model that is applicable to graphs, such as a GNN, GCN, or GAN, may be used to process the directed graph to generate the output that is indicative of the likelihood.

Additionally or alternatively, and as mentioned previously, in some implementations, the graph-specific machine learning model may be applied to the directed graph to generate an embedding. That embedding may then be applied as input across another machine learning model, e.g., to generate output indicative of a likelihood that a developing event is occurring, and/or output indicative of whether the developing event would be relevant to a particular user (or more generally, to users having particular features or attributes).

Based on a determination that the likelihood satisfies a criterion, at block 608, the system may cause one or more computing devices to render, as output, information about the developing event. In some implementations, the system may cause one or more computing devices associated with first responders such as fire departments, police departments, etc., to raise an alert, alarm, etc. that is meant to trigger responsive action by the first responder. For example, in some implementations, natural language output may be generated and broadcast over one or more devices carried by first responders, such as radios, etc., that indicates the nature of a developing event (e.g., one code for fire, another code for a robbery, another code for a riot, etc.) and/or its location.

Additionally or alternatively, in some implementations, one or more users who learn of a developing event may compose and submit, e.g., to a search engine having access to a knowledge graph 136, a search query seeking information about the event. It is possible, especially immediately after the developing event begins to unfold, that these traditional data sources may not yet have sufficient information about the event to respond. Accordingly, in various implementations, the system may leverage queries received from other users about the developing event to provide the requesting user with additional information to the extent possible. An example of this was depicted in FIG. 4.

Figure 7:
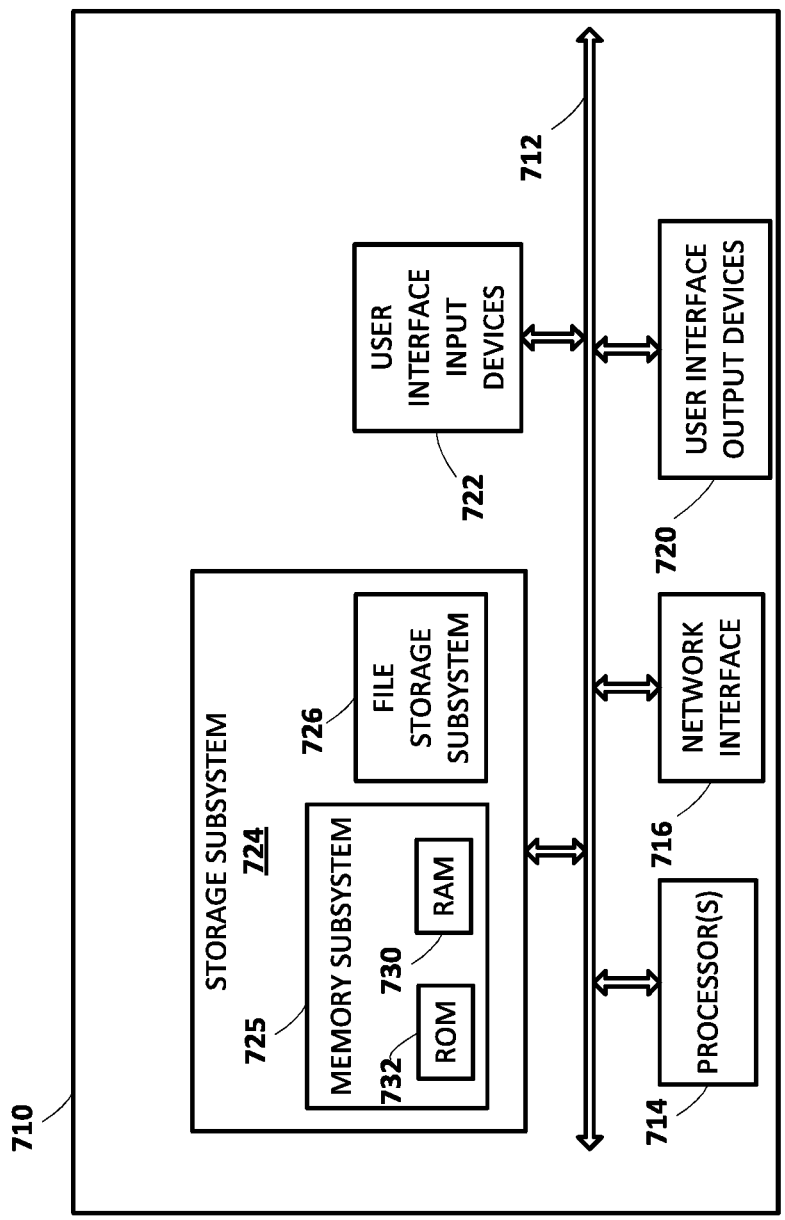
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 6, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    monitoring a plurality of live data streams;
    based on the monitoring, generating a data structure that models diffusion of information through a population;
    applying the data structure as input across a machine learning model to generate output, wherein the output is indicative of a likelihood of occurrence of a developing event; and
    based on a determination that the likelihood of occurrence of a developing event satisfies a criterion, causing one or more computing devices to render, as output, information about the developing event;
    wherein the data structure comprises a graph and the machine learning model is trained using a plurality of training examples, each training example including a prior graph that modeled diffusion of information about a respective verified past event through a plurality of sources.

2. The method of claim 1, wherein the data structure comprises a directed graph, and the directed graph is generated based on an underlying network model that includes a plurality of nodes representing sources and a plurality of edges representing communication pathways between the plurality of sources.

3. A method implemented using one or more processors, comprising:
monitoring a plurality of live data streams;
based on the monitoring, generating a graph that models diffusion of information through a population;
applying the graph as input across a first machine learning model to generate an embedding;
applying the embedding and one or more preferences or interests of a particular user as inputs across a second machine learning model to generate a predicted measure of relevancy of a developing event to the particular user; and
based on a determination that the measure of relevancy of the developing event to the particular user satisfies a criterion, causing one or more computing devices controlled by the particular user to render, as output to the particular user, information about the developing event.

4. A method implemented using one or more processors, comprising:
monitoring a plurality of live data streams;
based on the monitoring, generating a data structure that models diffusion of information through a population;
applying the data structure as input across a machine learning model to generate output, wherein the output is indicative of a likelihood of occurrence of a developing event; and
based on a determination that the likelihood of occurrence of a developing event satisfies a criterion, causing one or more computing devices to render, as output, information about the developing event;
wherein the machine learning model comprises a machine learning model trained to operate on graph input.

5. A method implemented using one or more processors, comprising:
monitoring a plurality of live data streams;
based on the monitoring, generating a data structure that models diffusion of information through a population;
applying the data structure as input across a machine learning model to generate output, wherein the output is indicative of a likelihood of occurrence of a developing event; and
based on a determination that the likelihood of occurrence of a developing event satisfies a criterion, causing one or more computing devices to render, as output, information about the developing event;
wherein the information about the developing event is determined based at least in part on a corpus of queries submitted to one or more search engines, wherein the corpus of queries relate to the developing event.

6. The method of claim 5, wherein the information about the developing event comprises an alternative query suggestion to obtain additional information about the developing event.

7. A system comprising one or more processors and memory storing instructions that, in response to execution of the instructions by the one or more processors, cause the one or more processors to:
monitor a plurality of live data streams;
based on the monitoring, generate a graph that models diffusion of information through a population;
apply the graph as input across a first machine learning model to generate an embedding;
apply the embedding and one or more preferences or interests of a particular user as inputs across a second machine learning model to generate a predicted measure of relevancy of a developing event to the particular user; and
based on a determination that the measure of relevancy of the developing event to the particular user satisfies a criterion, cause one or more computing devices controlled by the particular user to render, as output to the particular user, information about the developing event.

8. The system of claim 7, wherein the data structure comprises a directed graph, and the directed graph is generated based on an underlying network model that includes a plurality of nodes representing sources and a plurality of edges representing communication pathways between a plurality of sources.

9. The system of claim 7, wherein the data structure comprises a graph and the machine learning model is trained using a plurality of training examples, each training example including a prior graph that modeled diffusion of information about a respective verified past event through a plurality of sources.

10. The system of claim 7, wherein the machine learning model is trained to operate on graph input.

11. The system of claim 7, wherein the information about the developing event is determined based at least in part on a corpus of queries submitted to one or more search engines, wherein the corpus of queries relate to the developing event.

12. The system of claim 11, wherein the information about the developing event comprises an alternative query suggestion to obtain additional information about the developing event.

13. At least one non-transitory computer-readable medium comprising instructions that, in response to execution of the instructions by one or more processors, cause the one or more processors to perform the following operations:
monitoring a plurality of live data streams;
based on the monitoring, generating a data structure that models diffusion of information through a population;
applying the data structure as input across a machine learning model to generate output, wherein the output is indicative of a likelihood of occurrence of a developing event; and
based on a determination that the likelihood of occurrence of a developing event satisfies a criterion, causing one or more computing devices to render, as output, information about the developing event;
wherein the information about the developing event is determined based at least in part on a corpus of queries submitted to one or more search engines, wherein the corpus of queries relate to the developing event.

14. The at least one non-transitory computer-readable medium of claim 13, wherein the data structure comprises a directed graph, and the generating comprises generating the directed graph based on an underlying network model that includes a plurality of nodes representing sources and a plurality of edges representing communication pathways between a plurality of sources.

15. The at least one non-transitory computer-readable medium of claim 13, wherein the data structure comprises a graph and the machine learning model is trained using a plurality of training examples, each training example including a prior graph that modeled diffusion of information about a respective verified past event through a plurality of sources.

16. The at least one non-transitory computer-readable medium of claim 13, wherein the output is further indicative of a predicted measure of relevancy of the developing event to a particular user, and wherein the applying further includes applying one or more attributes of the particular user as input across the machine learning model.

* * * * *